(12) United States Patent    (10) Patent No.: US 8,756,099 B2
Keithley et al.    (45) Date of Patent: Jun. 17, 2014

(54) CONSUMER PROCESSING SYSTEM AND METHOD

(75) Inventors: Thomas H. Keithley, Monkton, MD (US); Vincent W. Talbert, Cockeysville, MD (US); Mark L. Lavelle, Govans, MD (US)

(73) Assignee: Bill Me Later, Inc., Timonium, MD (US)

( * ) Notice: Subject to any disclaimer, the term of this patent is extended or adjusted under 35 U.S.C. 154(b) by 1669 days.

(21) Appl. No.: 11/102,986

(22) Filed: Apr. 11, 2005

(65) Prior Publication Data

US 2006/0229996 A1    Oct. 12, 2006

(51) Int. Cl.
*G06Q 99/00*    (2006.01)
*G06Q 30/02*    (2012.01)

(52) U.S. Cl.
CPC ................................. *G06Q 30/0226* (2013.01)
USPC ........................................................ 705/14.1

(58) Field of Classification Search
USPC ........... 705/1, 10, 16, 26–27, 50, 64, 75, 14.1
See application file for complete search history.

(56) References Cited

U.S. PATENT DOCUMENTS

| | | | |
|---|---|---|---|
| 3,920,908 A | 11/1975 | Kraus | |
| 4,191,860 A | 3/1980 | Weber | |
| 4,291,198 A | 9/1981 | Anderson et al. | |
| 4,757,267 A | 7/1988 | Riskin | |
| 4,969,183 A | 11/1990 | Reese | |
| 4,996,705 A | 2/1991 | Entenmann et al. | |
| 5,010,238 A | 4/1991 | Kadono et al. | |
| 5,012,077 A | 4/1991 | Takano | |
| 5,120,945 A | 6/1992 | Nishibe et al. | |
| 5,329,589 A | 7/1994 | Fraser et al. | |
| 5,446,885 A | 8/1995 | Moore et al. | |
| 5,537,315 A | 7/1996 | Mitcham | |
| 5,793,028 A | 8/1998 | Wagener et al. | |
| 5,794,221 A | 8/1998 | Egendorf | |
| 5,866,889 A | 2/1999 | Weiss et al. | |

(Continued)

FOREIGN PATENT DOCUMENTS

| | | |
|---|---|---|
| EP | 0 338 568 A2 | 10/1989 |
| EP | 0 829 813 A1 | 3/1998 |

(Continued)

OTHER PUBLICATIONS

Amilda Dymi, *A One-Stop Shopping Trip That Can Pay off Over Time*; Origination News, New York, Sep. 2003; vol. 12, Iss. 12, p. 5.

*Primary Examiner* — James D Nigh
(74) *Attorney, Agent, or Firm* — Haynes and Boone, LLP

(57) ABSTRACT

Disclosed is a consumer processing system for identifying and recognizing a consumer engaged in a transaction with a merchant. The system includes a consumer processing system interface for receiving, from a merchant, a consumer/transaction data set with a plurality of fields. A consumer/transaction database is populated with data sets, and each data set is related to a specific consumer and also includes multiple data fields therein. The consumer/transaction data set is established as part of an initial data set in the consumer/transaction database, and thereafter, during subsequent transactions, compared to an existing data field in an existing data set in the consumer/transaction database. Based upon the establishment or comparison, a consumer activity data set is communicated from the consumer processing system interface to the merchant. A method of identifying and recognizing a consumer engaged in a transaction with a merchant is also disclosed.

35 Claims, 3 Drawing Sheets

(56) References Cited

U.S. PATENT DOCUMENTS

| | | |
|---|---|---|
| 5,870,721 A | 2/1999 | Norris |
| 5,883,810 A | 3/1999 | Franklin et al. |
| 5,940,811 A | 8/1999 | Norris |
| 6,000,832 A | 12/1999 | Franklin et al. |
| 6,029,150 A | 2/2000 | Kravitz |
| 6,029,890 A | 2/2000 | Austin |
| 6,032,136 A | 2/2000 | Brake, Jr. et al. |
| 6,078,891 A * | 6/2000 | Riordan et al. ............... 705/7.34 |
| 6,098,053 A | 8/2000 | Slater |
| 6,105,007 A | 8/2000 | Norris |
| 6,122,624 A | 9/2000 | Tetro et al. |
| 6,188,994 B1 | 2/2001 | Egendorf |
| 6,202,053 B1 | 3/2001 | Christiansen et al. |
| 6,227,447 B1 | 5/2001 | Campisano |
| 6,289,319 B1 | 9/2001 | Lockwood |
| 6,298,330 B1 * | 10/2001 | Gardenswartz et al. ... 705/14.25 |
| 6,317,783 B1 | 11/2001 | Freishtat et al. |
| 6,324,524 B1 | 11/2001 | Lent et al. |
| 6,332,128 B1 * | 12/2001 | Nicholson .................. 705/14.26 |
| 6,332,134 B1 | 12/2001 | Foster |
| 6,341,724 B2 | 1/2002 | Campisano |
| 6,351,739 B1 | 2/2002 | Egendorf |
| 6,477,578 B1 | 11/2002 | Mhoon |
| 6,505,171 B1 | 1/2003 | Cohen et al. |
| 6,675,153 B1 | 1/2004 | Cook et al. |
| 6,704,714 B1 | 3/2004 | O'Leary et al. |
| 6,785,661 B1 | 8/2004 | Mandler et al. |
| 6,820,202 B1 | 11/2004 | Wheeler et al. |
| 6,839,690 B1 | 1/2005 | Foth et al. |
| 6,839,692 B2 | 1/2005 | Carrott et al. |
| 6,868,408 B1 | 3/2005 | Rosen |
| 6,883,022 B2 | 4/2005 | Van Wyngarden |
| 6,889,325 B1 | 5/2005 | Sipman et al. |
| 6,901,373 B1 * | 5/2005 | Chasko ...................... 705/14.26 |
| 6,915,272 B1 | 7/2005 | Zilliacus et al. |
| 6,931,382 B2 | 8/2005 | Laage et al. |
| 6,957,334 B1 | 10/2005 | Goldstein et al. |
| 6,970,853 B2 | 11/2005 | Schutzer |
| 6,976,008 B2 | 12/2005 | Egendorf |
| 6,980,970 B2 | 12/2005 | Krueger et al. |
| 7,006,986 B1 | 2/2006 | Sines et al. |
| 7,051,001 B1 | 5/2006 | Slater |
| 7,107,243 B1 | 9/2006 | McDonald et al. |
| 7,177,836 B1 | 2/2007 | German et al. |
| 7,263,506 B2 | 8/2007 | Lee et al. |
| 7,406,442 B1 | 7/2008 | Kottmeier, Jr. et al. |
| 7,653,594 B2 * | 1/2010 | Davis ............................. 705/39 |
| 7,716,080 B2 * | 5/2010 | Postrel ...................... 705/14.27 |
| 2001/0034702 A1 | 10/2001 | Mockett et al. |
| 2001/0034724 A1 | 10/2001 | Thieme |
| 2002/0007302 A1 | 1/2002 | Work et al. |
| 2002/0007341 A1 | 1/2002 | Lent et al. |
| 2002/0032860 A1 | 3/2002 | Wheeler et al. |
| 2002/0035538 A1 | 3/2002 | Moreau |
| 2002/0052833 A1 | 5/2002 | Lent et al. |
| 2002/0069166 A1 | 6/2002 | Moreau et al. |
| 2002/0087467 A1 | 7/2002 | Mascavage, III et al. |
| 2002/0099649 A1 | 7/2002 | Lee et al. |
| 2002/0107793 A1 | 8/2002 | Lee |
| 2002/0112160 A2 | 8/2002 | Wheeler et al. |
| 2002/0120537 A1 | 8/2002 | Morea et al. |
| 2002/0120864 A1 | 8/2002 | Wu et al. |
| 2002/0156688 A1 | 10/2002 | Horn et al. |
| 2002/0178071 A1 | 11/2002 | Walker et al. |
| 2002/0198822 A1 | 12/2002 | Munoz et al. |
| 2003/0036996 A1 | 2/2003 | Lazerson |
| 2003/0061157 A1 | 3/2003 | Hirka et al. |
| 2003/0120615 A1 | 6/2003 | Kuo |
| 2003/0144952 A1 | 7/2003 | Brown et al. |
| 2003/0149656 A1 | 8/2003 | Magruder et al. |
| 2003/0200172 A1 * | 10/2003 | Randle et al. ................... 705/39 |
| 2003/0200184 A1 | 10/2003 | Dominguez et al. |
| 2004/0034570 A1 * | 2/2004 | Davis ............................. 705/26 |
| 2004/0064368 A1 * | 4/2004 | Koser et al. ..................... 705/14 |
| 2004/0078328 A1 | 4/2004 | Talbert et al. |
| 2004/0111362 A1 | 6/2004 | Nathans et al. |
| 2004/0151292 A1 | 8/2004 | Larsen |
| 2004/0186807 A1 | 9/2004 | Nathans et al. |
| 2004/0226995 A1 * | 11/2004 | Smith ........................... 235/383 |
| 2005/0021400 A1 * | 1/2005 | Postrel ........................... 705/14 |
| 2005/0038715 A1 | 2/2005 | Sines et al. |
| 2005/0071266 A1 | 3/2005 | Eder |
| 2005/0125336 A1 | 6/2005 | Rosenblatt et al. |
| 2005/0131808 A1 | 6/2005 | Villa |
| 2005/0246278 A1 | 11/2005 | Gerber et al. |
| 2006/0064372 A1 | 3/2006 | Gupta |
| 2006/0106699 A1 | 5/2006 | Hitalenko et al. |
| 2006/0178988 A1 | 8/2006 | Egendorf |
| 2006/0184428 A1 | 8/2006 | Sines et al. |
| 2006/0184449 A1 | 8/2006 | Eder |
| 2006/0184570 A1 | 8/2006 | Eder |
| 2006/0226216 A1 | 10/2006 | Keithley et al. |
| 2006/0229996 A1 | 10/2006 | Keithley et al. |
| 2006/0248016 A1 | 11/2006 | Ginter et al. |
| 2006/0265335 A1 | 11/2006 | Hogan et al. |
| 2006/0266819 A1 | 11/2006 | Sellen et al. |
| 2006/0289621 A1 | 12/2006 | Foss, Jr. et al. |
| 2007/0005445 A1 | 1/2007 | Casper |
| 2007/0250919 A1 | 10/2007 | Shull et al. |
| 2007/0288375 A1 | 12/2007 | Talbert et al. |
| 2008/0046334 A1 | 2/2008 | Lee et al. |
| 2008/0052244 A1 | 2/2008 | Tsuei et al. |
| 2008/0195528 A1 | 8/2008 | Keithley |

FOREIGN PATENT DOCUMENTS

| | | |
|---|---|---|
| EP | 1223524 A2 | 7/2002 |
| WO | WO 88/10467 A | 12/1988 |
| WO | WO 00/02150 A1 | 1/2000 |
| WO | WO 00/67177 A2 | 11/2000 |
| WO | WO 02/23439 A1 | 3/2002 |

* cited by examiner

CONSUMER PROCESSING SYSTEM AND METHOD

BACKGROUND OF THE INVENTION

1. Field of the Invention

The present invention relates generally to consumer processing and transaction systems and, in particular, to a consumer processing system and method for identifying and recognizing a consumer or customer engaged in a transaction with a merchant, such as the identification and recognition of a repeat customer at a particular point-of-sale.

2. Description of Related Art

In order to enable convenient purchases or goods and services by consumers, the financial service industry has developed many alternative payment methods that allow a consumer to engage in a transaction and receive goods and services on credit. For example, such alternative payment methods may include checks, ATM or debit cards, credit cards, charge cards, etc. In addition, these credit vehicles are able to be used on many platforms and via many communication methods and processes. For example, a credit or charge card may be used over the telephone, by mail or electronically over the Internet or at an in-store location. The benefit of existing payment methods allows a consumer to move the point-of-sale (POS) from an in-store location to one's home. For example, a consumer may place an order from a catalog over the telephone and use a credit card or a charge card to pay for the goods and/or services. A similar process can be used for mail orders.

Virtual commerce and the growth of the Internet as a medium for commerce have placed pressure on the payment options discussed above with respect to both convenience, transactional security and profitability by the credit issuer. However, the consumer's convenience is paramount, and the Internet provides yet another POS, or option, to the consumer for purchasing goods and/or services via an alternative medium. This growth in commerce on the Internet and over the telephone has also placed additional burdens on the merchant, such as identification and recognition of a customer. However, this burden also may lead to certain benefits, such as the ability to identify and recognize customers in not only a negative sense, such as in the identification of fraud or bad credit, but also in a positive sense, such as in the opportunity to offer additional benefit to a repeat customer in good standing.

Moving the POS to the consumer's home, the consumer can use the telephone or otherwise conduct business over the Internet, which provides a tangible benefit to the consumer. Such remote transactions provide the consumer with a certain amount of anonymity, as well as a much greater amount of convenience in making purchases. Likewise, the merchant obtains more business by opening up these lines of communication and allowing for the engagement in such a transaction at remote points-of-sale.

However, both the consumers and the merchants suffer in one important respect. In particular, when operating in a real-time sales environment, the merchant typically has no way of quickly determining whether a consumer is a repeat customer. Accordingly, the merchant may suffer by offering goods and services to a person with a fraudulent history or bad credit characteristics, based upon these previous sales. Such activity is detrimental to the merchant, and could have been avoided had the merchant been able to identify and recognize this repeat consumer. Similarly, both the merchant and consumer may suffer from this lack of identification and recognition on the "positive" side of a previous transaction. For example, a repeat and "good" customer may be offered additional benefits or special merchant offers, which will further engender the consumer to the merchant and provide the merchant with additional business. However, since such repeat consumers cannot be identified or recognized in many cases, the ability to provide such a benefit to the consumer, which indirectly also benefits the merchant, is unavailable.

Therefore, it is the merchant's ability to identify and recognize a consumer using various data transmitted to the merchant that allows for this mutually beneficial and ongoing consumer/merchant relationship. Of course, as discussed above, this relationship may be a potential "negative" relationship (such as in bad credit) or a "positive" relationship (such as in offering "perks" to the best customers). In either case, the merchant must have access to this valuable information and data in order to decide how best to interact with any individual consumer.

According to the prior art, existing merchants have used various approaches in order to overcome the inability to quickly identify repeat customers, such as quickly identifying repeat customers in a real-time sales environment. For example, some merchants attempt to solve this problem by requiring a log-in by the customer prior to purchase. Many times, this approach causes abandonment of shopping carts and reduces the total sales that a merchant will close. Therefore, this log-in process reduces the merchant's aggregate revenue and profit. Other merchants invest in software, purchased externally or internally developed, as well as hardware, to run real-time applications that use various methods to identify existing customers. However, such an approach raises a merchant's capital expenditure and operating costs. Still further, some merchants do neither the log-in process nor invest in any software, and forego the business benefit of knowing who was a repeat customer in real-time. These merchants usually run a monthly or weekly batch process to identify the repeat customers, but this process does not allow them any real-time benefit.

SUMMARY OF THE INVENTION

It is, therefore, an object of the present invention to provide a consumer processing system and method that overcomes the deficiencies of the prior art. It is another object of the present invention to provide a consumer processing system and method that is capable of quickly identifying a consumer engaged in a transaction with a merchant, such as in a real-time sales environment. It is a further object of the present invention to provide a consumer processing system and method that allows a merchant to recognize a repeat consumer during a subsequent transaction. It is yet another object of the present invention to provide a consumer processing system and method that provides the merchant with the appropriate data to make a decision regarding how best to interact with a consumer in all subsequent transactions. It is a still further object of the present invention to provide a consumer processing system and method that allows the merchant access to a consumer data warehouse for establishing a historical transactional database with respect to each individual consumer. It is yet another object of the present invention to provide a consumer processing system and method that is adapted for facilitating a better relationship between the consumer and the merchant at remote POS locations.

The present invention is directed to a consumer processing system. The consumer processing system identifies and recognizes a consumer engaged in a transaction with a merchant. In particular, the system includes a consumer processing system interface for receiving, from a merchant, a consumer/ transaction data set, which has multiple data fields therein. A consumer/transaction database is included and populated with multiple-data sets, and each data set relates to a specified customer or consumer, and further each data set includes multiple data fields therein. One or more of the data fields in the received consumer/transaction data set is either: (1) established as part of an initial data set in the consumer/transaction database; or (2) compared to an existing data field in an existing data set in the consumer/transaction database. Based upon the establishment or comparison, a consumer activity data set is communicated from the consumer processing system interface to the merchant.

In one embodiment, the consumer activity data set includes consumer recognition data. This consumer recognition data is selected and provided based upon the current transaction between the consumer and the merchant, a previous transaction between the consumer and the merchant, historical transaction data, tracking data specific to a consumer, a value reflective of a consumer's transaction history with a merchant, data associated with transactions with a merchant, transaction-specific data, customer-specific data, transaction frequency data, transaction amount data, cumulative transaction frequency data, cumulative transaction amount data, and/or customer demographic data. In addition, the consumer activity data set may include merchant offering data reflecting an established offer to the consumer of a service, item, discount, redemption, coupon, voucher, non-cash benefit, incentive, ticket, invitation, event, etc. Further, the data set may include merchant denial data reflecting an instruction to the merchant, and advising the merchant to deny the transaction, deny a purchase request, deny a credit request, and/or take a specified action with respect to the consumer.

The present invention is further directed to a method of identifying and recognizing a consumer engaged in a transaction with a merchant. The method includes the steps of: receiving, from a merchant, a consumer/transaction data set having a plurality of data fields; establishing at least a portion of the consumer/transaction data set as part of an initial data set in a consumer/transaction database; or comparing at least a portion of the consumer/transaction data set to an existing data field in an existing data set in a consumer/transaction database; and communicating a consumer activity data set to the merchant based at least in part upon the establishment or comparison step.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
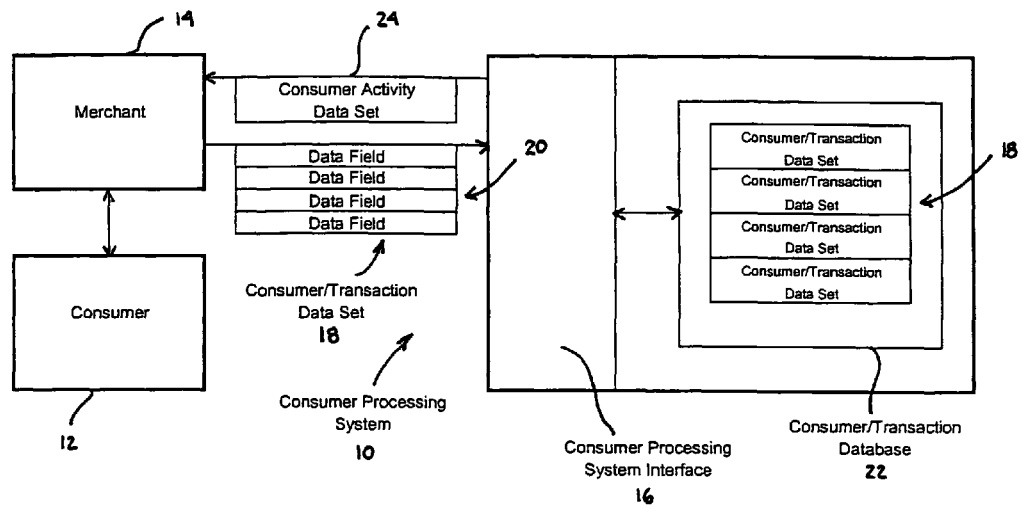
FIG. 1 is a schematic view of a consumer processing system according to the present invention.
Figure 2:
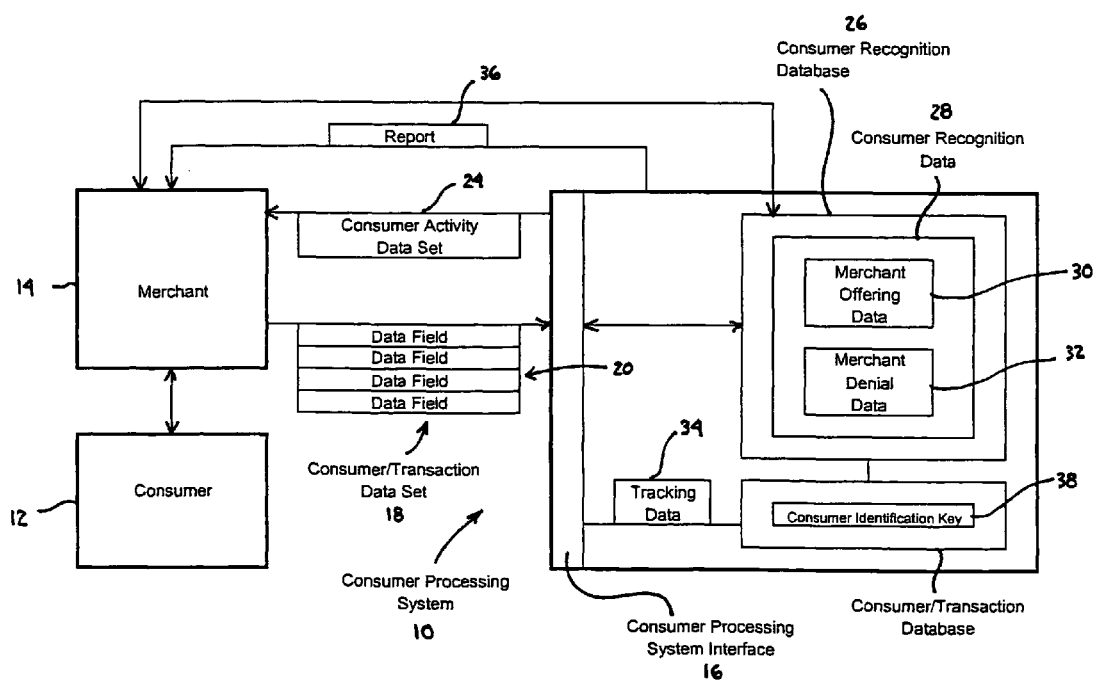
FIG. 2 is a schematic view of a further embodiment of a consumer processing system according to the present invention.
Figure 3:
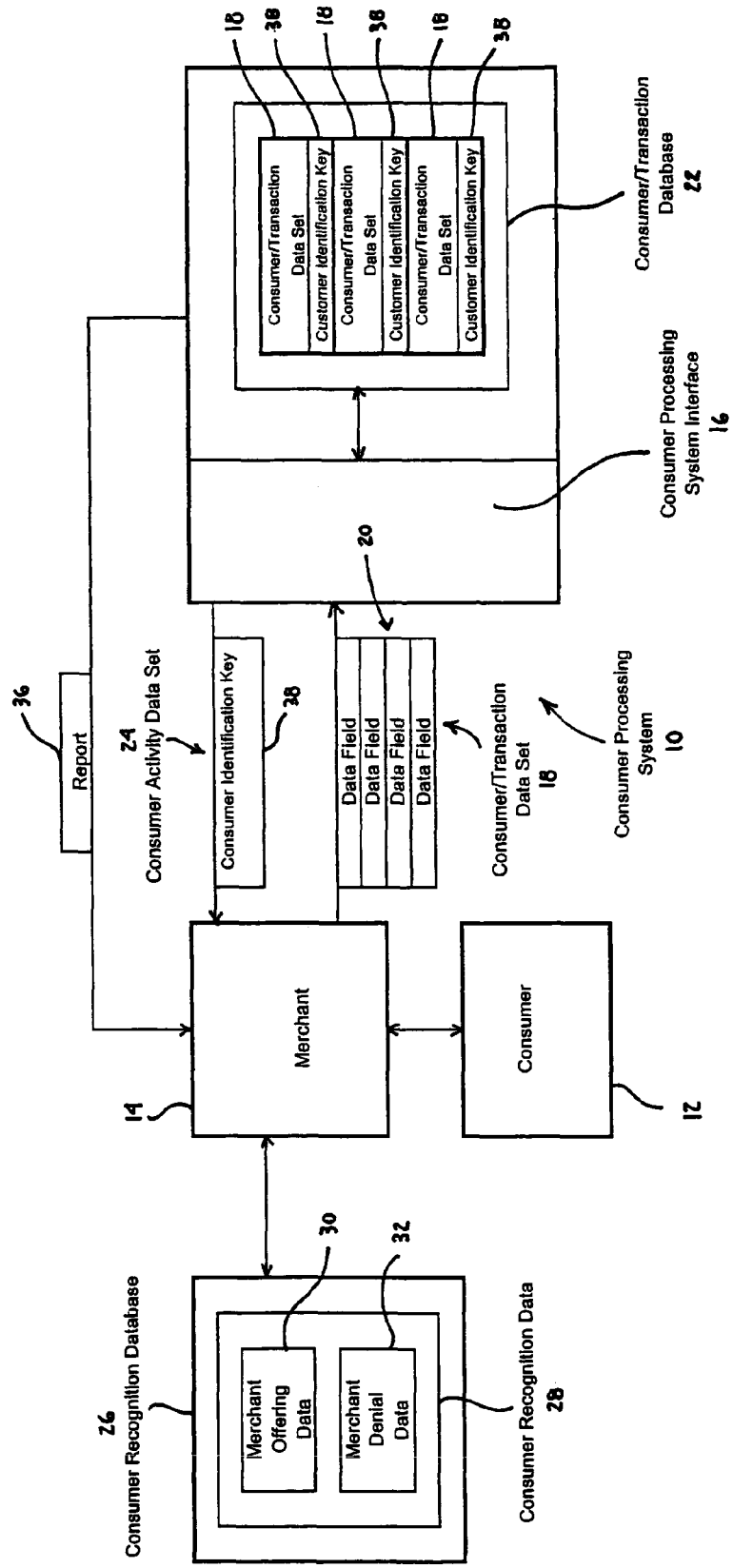
FIG. 3 is a schematic view of a still further embodiment of a consumer processing system according to the present invention.
Figure 4:
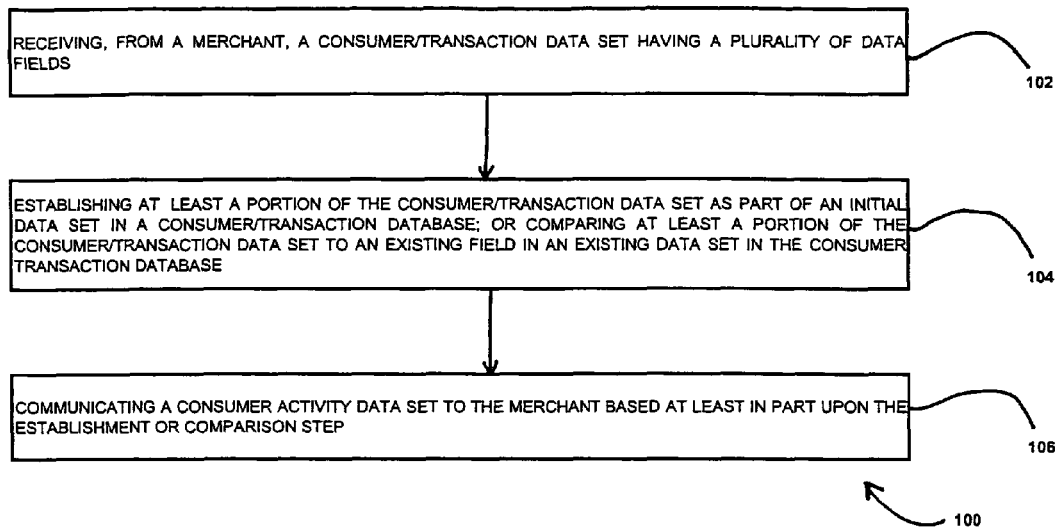
FIG. 4 is a flow diagram of a method of identifying and recognizing a consumer engaged in a transaction with a merchant according to the present invention.

The present invention is directed to a consumer processing system 10 and method 100 of identifying and recognizing a consumer 12 engaged in a transaction with a merchant 14. Various embodiments of the consumer processing system 10 of the present invention are illustrated in FIGS. 1-3. A flow diagram of the method 100 is illustrated in FIG. 4.

Referring to FIG. 1, in one embodiment, the consumer processing system 10, which identifies and recognizes consumers 12 engaged in a transaction with a merchant 14, includes a consumer processing system interface 16. This interface 16 receives, from the merchant 14, a consumer/transaction data set 18, which includes multiple data fields 20 therein. In addition, the system 10 includes a consumer/transaction database 22, which is populated with multiple data sets, and each data set relates to a specified consumer 12. Further, each data set also has multiple data fields therein.

After receipt of the consumer/transaction data set 18 by the consumer processing system interface 16, the system 10 either establishes this data set 18 as part of some initial data set in a consumer/transaction database 22 or compares one or more of the data fields 20 in the consumer/transaction data set 18 to one or more of the fields in an existing data set in the consumer/transaction database 22. Based upon the establishment of the data sets or the comparison of data fields, a consumer activity data set 24 is communicated from the consumer processing system interface 16 to the merchant 14. The merchant 14, in turn, can use the data and information in the consumer activity data set 24 to appropriately interact with or otherwise communicate with the consumer 12.

In one embodiment, the data fields 20 in the consumer/transaction data set 18 are populated with data that is reflective of the consumer 12 and/or the transaction information for the transaction between the consumer 12 and the merchant 14. For example, the data fields 20 in the consumer/transaction data set 18 may be populated with data reflecting a consumer's name, a consumer key, a consumer identification, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, consumer type, a company identity, a merchant identity, a third-party risk score, risk data, authentication data, verification data, consumer rating data, profitability data, credit risk data, fraud risk data, transaction risk data, denial data, processing data, a general credit risk score, a credit bureau risk score, a prior approval, prior report data, previous transaction data, a geographical risk factor, credit account data, bankcard balance data, delinquency data, credit segment data, previous transaction data, time between transactions data, previous transaction amount, previous transaction approval status, previous transaction time stamp data, a response code, active trades in database, public record data, trade line data, transaction medium, credit segment data, consumer payment type, consumer payment method, consumer payment history, consumer account history, consumer credit account balance, merchant history, private label entity data, affiliated private label entity and/or consumer/merchant historical data. In a preferred embodiment, the data fields 20 in the consumer/transaction data set 18 are populated with data that reflects the historical interaction between the consumer 12 and the merchant 14 or some other previous consumer/merchant transaction or interaction.

Using the data fields 20 in the consumer/transaction data set 18, the consumer processing system 10 will initially establish, using some or all of this data, a consumer-specific data set in the consumer/transaction database 22. Accordingly, the data fields and data sets in the consumer/transaction database 22 may be populated with data reflecting a consumer's name, a consumer key, a consumer identification, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, consumer type, a company identity, a merchant identity, a third-party risk score, risk data, authentication data, verification data, consumer rating data, profitability data, credit risk data, fraud risk data, transaction risk data, denial data, processing data, a general credit risk score, a credit bureau risk score, a prior approval, prior report data, previous transaction data, a geographical risk factor, credit account data, bankcard balance data, delinquency data, credit segment data, previous transaction data, time between transactions data, previous transaction amount, previous transaction approval status, previous transaction time stamp data, a response code, active trades in database, public record data, trade line data, transaction medium, credit segment data, consumer payment type, consumer payment method, consumer payment history, consumer account history, consumer credit account balance, merchant history, private label entity data, affiliated private label entity and/or consumer/merchant historical data.

After establishment, the incoming consumer/transaction data set 18 is compared with or otherwise linked to the customer-specific data set in the consumer/transaction database 22. Accordingly, the system 10 may perform a variety of actions after establishing a match between the incoming consumer/transaction data set 18 and the information in the consumer/transaction database 22. In general, the data fields 20 in the consumer/transaction data set 18 are obtained by the merchant 14 at the POS from the consumer 12. However, even a very minimal amount of collected information at the POS can be used and transmitted to the consumer processing system interface 16, where the consumer processing system 10 is able to use this limited information to identify the consumer 12, as well as build a historical index of data directed to the consumer's 12 previous interactions with the merchant 14.

In another embodiment, as seen in FIG. 2, the system 10 also includes a consumer recognition database 26. This consumer recognition database 26 includes multiple data fields therein, and the data fields are populated with data reflecting consumer recognition data 28. Therefore, and in one embodiment, based upon at least one data field 20 in the consumer/transaction data set 18, at least one data field in the consumer/transaction database 22 and at least one data field in the consumer recognition database 26, the consumer activity data set 24 is established. In one embodiment, the consumer recognition data 28 includes merchant offering data 30. This merchant offering data 30 may reflect an established offer to the consumer 12 of a service, an item, a discount, a redemption, a coupon, a voucher, a non-cash benefit, an incentive, a ticket, an invitation, an event, etc. Such merchant offering data 30 would be transmitted from the merchant 14 to the consumer 12 as a reward for engaging in multiple or subsequent transactions with a specific merchant 14 or a group of merchants 14. In this sense, the merchant offering data 30 establishes a better relationship between the consumer 12 and the merchant 14, and provides a benefit to the consumer 12 for being a preferred or "best" customer.

The consumer recognition data 28, which is normally part of the consumer activity data set 24 transmitted to the merchant 14, may also be selected based upon a number of different existing conditions. For example, the consumer recognition data 28 may be based upon the current transaction between the consumer 12 and the merchant 14, a previous transaction between the consumer 12 and the merchant 14, historical transaction data, tracking data specific to a consumer 12, a value reflective of the consumer's 12 transaction history with the merchant 14, transaction data, customer or transaction-specific data, frequency data, cumulative data and other similar demographic information.

The consumer recognition database 26 can be in communication with and/or maintained by the consumer processing system 10, some central processing system, the merchant 14, a seller, an Internet site, an online entity, a web store, a telephone seller, a group of merchants 14, an organization of merchants 14, an entity, a corporation, a company, an offeror of goods, an offeror of services, an affiliation of multiple entities, etc. As seen in the embodiment of FIG. 2, the consumer recognition database 26 is maintained by and within the consumer processing system 10. However, the merchant 14 has the ability to transmit consumer recognition data 28 to the consumer recognition database 26. In this embodiment, the consumer recognition database 26 is modifiable and/or configurable by the consumer processing system 10, the merchant 14 or any of the entities set forth above. As seen in FIG. 2, the consumer recognition data 28 is communicated from the merchant 14 to the consumer processing system 10 according to the merchant's 14 desire to revise the consumer recognition database 26. For example, the merchant 14 may want to provide additional offers or consumer recognition data 28 to the consumer recognition database 26, such that this new consumer recognition data 28 is transmitted back through the merchant 14 or another affiliated merchant 14 and on to the consumer 12. This communication between the merchant 14 and the consumer recognition database 26 may be on a continual basis, a dynamic basis, a batch basis, a periodic basis, etc., and this consumer recognition data 28 is stored in the consumer recognition database 26.

As discussed above, the consumer recognition data 28 may also include merchant denial data 32. This merchant denial data 32 reflects a negative merchant/consumer interaction. For example, the merchant denial data 32 may be an instruction to the merchant 14, advising the merchant 14 to deny the transaction with the consumer 12, deny some purchase request, deny a credit request and/or take some other specified action with respect to the consumer 12. Therefore, based upon the consumer/transaction data set 18 transmitted to the consumer processing system interface 16, the consumer 12 is identified and recognized and, based on the consumer's 12 past behavior, the consumer recognition data 28 can warn a merchant 14 what is the best manner in interacting with the consumer 12. This "warning" information and data would be part of the consumer activity data set 24.

In one embodiment, and based upon the transaction, the system 10 may also track the consumer's 12 transactions with the merchant 14, and thereby compile tracking data specific to the consumer 12. Accordingly, the consumer activity data set 24 is established and based at least in part upon the tracking data 34 specific to the consumer 12. This tracking data 34 represents additional and valuable information that can be provided to the merchant 14 for the decision making process in the transaction between the merchant 14 and the consumer 12.

The merchant 14 may be a seller, an Internet site, an online entity, a web store, a telephone seller, a group of merchants 14, an organization of merchants 14, an entity, a corporation, a company, an offeror of goods, an offeror of services, an affiliation of multiple entities, etc. For example, a group of merchants 14 can partner and share information or provide multi-merchant merchant offering data 30 to the consumer 12. Further, the merchant 14 may transmit to the consumer processing system interface 16 multiple consumer/transaction data sets 18. Each data set would be specific to an identified customer, and the multiple consumer/transaction data sets 18 would be stored in the consumer/transaction database 22. In short, the merchant 14 would provide a customer list with all available information about the customer to the consumer processing system 10 for data warehousing and establishing the consumer/transaction database 22.

Another advantage of the consumer processing system 10 and method 100 of the present invention is the ability to provide this service to multiple merchants 14, whether these merchants 14 are partnered or not. For example, and since there are not limits to the amount of data that can be warehoused in the consumer/transaction database 22 and the consumer recognition database 26, the system 10 (and particularly the databases therein) can act as a data vault that can provide secure information to each individual merchant 14, as well as an individualized consumer activity data set 24. Still further, it is envisioned that the compilation of the consumer/transaction data set 18 and the consumer/transaction database 22 can be offered across a variety of merchants 14, all of which are individually compiling specific consumer 12 data. Therefore, the information and data compiled about a consumer 12 at a first merchant 14, could be effectively used in the decision making process of the same consumer 12 at a different and unaffiliated merchant 14, provided that both merchants 14 agree to this information sharing. Accordingly, a comprehensive service can be paid for by a variety of unaffiliated merchants 14, with the databases 22, 26 of the system 10 acting as the central repository of information.

Based upon all of the information provided to the consumer processing system 10, and further based upon the historical transactions between a merchant 14 and the consumer 12, the consumer processing system 10 may provide a report 36 to the merchant 14. In particular, the report 36 may include compiled merchant-specific data. For example, the report 36 may be a compilation of data representing at least a portion of the consumer/transaction data set 24 for each consumer 12 or a group of consumers 12, or some other information stored in a consumer/transaction database 22 or the consumer recognition database 26. Further, the report 36 may provide summaries of data, such as the cumulative offers, denials, history data, consumer 12 data, consumer grouping data, etc.

As discussed above, the consumer activity data set 24 may include a variety of valuable, and often necessary, data for the merchant 14 to make decisions with respect to the consumer 12. For example, the consumer activity data set 24 may include consumer/transaction data, consumer recognition data, consumer/merchant historical data, transaction data, consumer demographic data, suggested consumer interaction data, suggested consumer offer data, pre-established consumer interaction data, pre-established consumer offer data, offer data, redemption data, merchant denial data and denial instruction data. In one preferred embodiment, the consumer activity data set 24 includes either merchant offering data 30 reflecting an established offer to the consumer 12 of a service, an item, a discount, a redemption, a coupon, a voucher, a non-cash benefit, an incentive, a ticket, an invitation, an event, etc.; or merchant denial data 32 reflecting an instruction to the merchant 14, advising the merchant 14 to deny the transaction, deny a purchase request, deny a credit request, or take some other specified action with respect to the consumer 12.

In a further embodiment of the present invention, the consumer/transaction data set 24 and/or the consumer/transaction database 22 include a consumer identification key 38. This consumer identification key 38 is unique to either a specific individual consumer 12 or a specified grouping of multiple consumers 12 having similar characteristics. In this manner, the consumer activity data set 24 is established based at least in part upon the consumer identification key 38. Using the consumer identification key 38, the identification of appropriate consumer recognition data 28 in the consumer recognition database 26 is facilitated. Accordingly, an individual "look-up" is not required for each individual consumer 12 in connection with the consumer recognition database 26, and instead this data is compiled and provided for an identified grouping of consumers 12. In addition, this key 38 may be sent to the merchant 14 for use in additional processing functions.

The present invention is also directed to a method 100 of identifying and recognizing a consumer 12 engaged in a transaction with a merchant 14. The method 100 includes the steps of: receiving, from the merchant 14, a consumer/transaction data set 18 having a plurality of data fields 20 (Step 102); establishing at least a portion of the consumer/transaction data set 18 as part of an initial data set in a consumer/transaction database 22; or comparing at least a portion of the consumer/transaction data set 18 to an existing data field in an existing data set in the consumer/transaction database 22 (Step 104); and communicating a consumer activity data set 24 to the merchant 14, based at least in part upon the establishment or comparison step (Step 106).

Overall, the present invention provides a consumer processing system 10 and method 100 that allows a merchant 14 to appropriately identify and recognize a consumer 12 engaged in a transaction with the merchant 14. In this manner, the merchant 14 is able to easily track and understand the activities of repeat consumers 12 and act accordingly. The actions that the merchant 14 takes with respect to the consumer 12 based upon the consumer activity data set 24 may be either positive or negative, but would be based upon historical data of the consumer's 12 activity with respect to the merchant 14 or a grouping of merchants 14.

While the consumer/transaction database 22 of the consumer processing system 10 may act as a data warehouse for all of the information in the consumer/transaction data set 18, the consumer recognition database 26 may be maintained on the system 10 side (see FIG. 2) or the merchant 14 side (see FIG. 3). Therefore, the merchant 14 may decide whether the consumer recognition database 26 should be maintained and kept apart from the normal systems of the merchant 14, or integrated therewith. The presently-invented system 10 and method 100 are particularly useful in connection with telephone order entities and online merchants 14, and more particularly in connection with online merchants 14 that do not require any sort of login or registration procedure, which may facilitate the identification of repeat customers. Accordingly, the present invention facilitates the identification and recognition of consumers 12, and provides the consumer activity data set 24 to the merchant 14 to make decisions regarding the present or future transactions with any particular consumer 12.

In this manner, the present invention provides a consumer processing system 10 that is highly accurate in identifying repeat customers in a real-time environment, such as in an online environment. Further, the consumer processing system 10 of the present invention is integratable into the merchant payment authorization step. In e-commerce, every merchant engaging in sales transactions must complete payment authorization in order to ship product to the customer and receive payment from their bank. Therefore, the present invention provides a consumer processing system 10 that integrates the customer identification step into the payment authorization step, which essentially gives the merchant a free solution that has none of the drawbacks noted above. Still further, the consumer processing system 10 of the present invention provides the merchant with highly useful information regarding repeat customers, such that the merchant may avoid a fraudulent sale, deliver a personalized discount, provide promotional offers to repeat customers, and provide other services both dynamically or subsequently.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A non-transitory computer-readable storage medium encoded with computer-executable instructions which when executed by a computer causes the computer to perform the steps of:
building a consumer/transaction database configured to be populated with a plurality of data sets, each data set relating to a specified consumer and a specified merchant and having a plurality of data fields therein, wherein the building comprises using received data from a merchant or consumer related to a specified consumer and a specified merchant in the consumer/transaction database;
receiving, from a merchant computer, a consumer/transaction data set having a plurality of data fields therein during a transaction between the specified consumer and the specified merchant;
comparing at least a portion of the received consumer/transaction data set to at least one existing data field in an existing data set relating to the specified consumer and the specified merchant in the consumer/transaction database;
determining in real time, based at least in part upon the comparing, a consumer activity data set, wherein the consumer activity data set includes:
data of prior activity of the consumer with the specified merchant and with an unaffiliated merchant who have both agreed to sharing information about the consumer compiled by the specified merchant and the unaffiliated merchant, and
data of a merchant offering to allow the specified merchant to make a real-time decision regarding the transaction or a future transaction with the consumer; and
communicating, in real-time to the merchant computer of the specified merchant prior to consummation of the transaction, the consumer activity data set, including the prior activity data and the real time merchant offering data.

2. The non-transitory computer-readable storage medium of claim 1, wherein at least one of the plurality of data fields in the consumer/transaction data set is populated with data reflecting at least one of the consumer and the transaction between the consumer and the merchant.

3. The non-transitory computer-readable storage medium of claim 1, wherein at least one of the plurality of data fields in the consumer/transaction data set is populated with data reflecting at least one of information about the consumer, the merchant, or a transaction between the consumer and the merchant.

4. The non-transitory computer-readable storage medium of claim 1, wherein at least one of the plurality of data fields in the consumer/transaction database is populated with data reflecting at least one of the historical interaction between the consumer and the merchant and a previous consumer/merchant transaction.

5. The non-transitory computer-readable storage medium of claim 1, wherein at least one of the plurality of data fields in the consumer/transaction database is populated with data reflecting at least one of information about the consumer, the merchant, or a transaction between the consumer and the merchant.

6. The non-transitory computer-readable storage medium of claim 1, further comprising a consumer recognition database including a plurality of data fields therein, wherein at least one of the plurality of data fields is populated with data reflecting consumer recognition data.

7. The non-transitory computer-readable storage medium of claim 6, wherein, based upon at least one data field in the consumer/transaction data set, at least one data field in the consumer/transaction database and at least one data field in the consumer recognition database, a consumer activity data set is established.

8. The non-transitory computer-readable storage medium of claim 6, wherein the consumer recognition data includes merchant offering data reflecting an established offer to the consumer of at least one of the following: a service, an item, a discount, a redemption, a coupon, a voucher, a non-cash benefit, an incentive, a ticket, an invitation, an event, or any combination thereof.

9. The non-transitory computer-readable storage medium of claim 6, wherein the consumer activity data set includes consumer recognition data, which is selected based upon at least one of the following: (i) the current transaction between the consumer and the merchant; (ii) a previous transaction between the consumer and the merchant; (iii) historical transaction data between the consumer and the merchant; (iv) tracking data specific to a consumer; (v) a value reflective of the consumer's transaction history with the merchant; (vi) data associated with transactions with the merchant; (vii) transaction-specific data; (viii) consumer-specific data; (ix) transaction frequency data; (x) transaction amount data; (xi) cumulative transaction frequency data; (xii) cumulative transaction amount data; (xiii) consumer demographic data, or any combination thereof.

10. The non-transitory computer-readable storage medium of claim 6, wherein a computer with the consumer recognition database is in communication with and maintained by at least one of the following: a central processing system, a merchant, a seller, an Internet site, an online entity, a web store, a telephone seller, a group of merchants, an organization of merchants, an entity, a corporation, a company, an offeror of goods, an offeror of services, an affiliation of a plurality of entities, or any combination thereof.

11. The non-transitory computer-readable storage medium of claim 6, wherein the consumer recognition database is modifiable and configurable by at least one of the following: a central processing system, a merchant, a seller, an Internet site, an online entity, a web store, a telephone seller, a group of merchants, an organization of merchants, an entity, a corporation, a company, an offeror of goods, an offeror of services, an affiliation of a plurality of entities, or any combination thereof.

12. The non-transitory computer-readable storage medium of claim 6, wherein the consumer recognition data is received from the merchant computer by the consumer processing system computer on at least one of the following: a continual, dynamic, batch and periodic basis, wherein the consumer recognition data is stored in the consumer recognition database.

13. The non-transitory computer-readable storage medium of claim 6, wherein the consumer recognition data includes merchant denial data reflecting a negative merchant/consumer interaction.

14. The non-transitory computer-readable storage medium of claim 13, wherein the merchant denial data is an instruction to the merchant, advising the merchant to at least one of the following: deny the transaction, deny a purchase request, deny a credit request, take a specified action with respect to the consumer, or any combination thereof.

15. The non-transitory computer-readable storage medium of claim 1, wherein, based upon the transaction, a consumer processing system computer is configured to track the consumer's transactions with the merchant, thereby compiling tracking data specific to a consumer.

16. The non-transitory computer-readable storage medium of claim 15, wherein the consumer activity data set is established based upon at least a portion of the tracking data specific to a consumer.

17. The non-transitory computer-readable storage medium of claim 1, wherein the merchant is at least one of the following: a seller, an Internet site, an online entity, a web store, a telephone seller, a group of merchants, an organization of merchants, an entity, a corporation, a company, an offeror of goods, an offeror of services, an affiliation of a plurality of entities, or any combination thereof.

18. The non-transitory computer-readable storage medium of claim 1, wherein the consumer processing system interface receives, from the merchant computer, a plurality of consumer/transaction data sets, each data set specific to an identified consumer, wherein the plurality of consumer/transaction data sets are stored in the consumer/transaction database.

19. The non-transitory computer-readable storage medium of claim 1, the merchant is provided with a report including compiled merchant-specific data.

20. The non-transitory computer-readable storage medium of claim 19, wherein the report is a compilation of data representing at least a portion of at least one consumer/transaction data set in the consumer/transaction database.

21. The non-transitory computer-readable storage medium of claim 1, wherein the consumer activity data set includes at least one of the following: consumer/transaction data, consumer recognition data, consumer/merchant historical data, transaction data, consumer demographic data, suggested consumer interaction data, suggested consumer offer data, pre-established consumer interaction data, pre-established consumer offer data, offer data, redemption data, merchant denial data, denial instruction data, or any combination thereof.

22. The non-transitory computer-readable storage medium of claim 1, wherein the consumer activity data set includes at least one of the following: (i) merchant offering data reflecting an established offer to the consumer of at least one of the following: a service, an item, a discount, a redemption, a coupon, a voucher, a non-cash benefit, an incentive, a ticket, an invitation, an event, or any combination thereof; and (ii) merchant denial data reflecting an instruction to the merchant, advising the merchant to at least one of the following: deny the transaction, deny a purchase request, deny a credit request, take a specified action with respect to the consumer, or any combination thereof.

23. The non-transitory computer-readable storage medium of claim 1, wherein at least one of the consumer/transaction data set and the consumer/transaction database includes a consumer identification key, which is unique to at least one of a specific individual consumer and a specified grouping of a plurality of consumers.

24. The non-transitory computer-readable storage medium of claim 23, wherein the consumer activity data set is established based at least in part on the consumer identification key.

25. A computer-implemented method of identifying and recognizing a consumer engaged in a transaction with a merchant, the method comprising:
building, by a computer, a consumer/transaction database on a consumer processing system computer, the consumer/transaction database configured to be populated with a plurality of data sets, each data set relating to a specified consumer and a specified merchant and having a plurality of data fields therein;
receiving, from a merchant computer, a consumer/transaction data set having a plurality of data fields therein at a consumer processing system interface on the consumer processing system computer;
comparing, by the computer, at least a portion of the consumer/transaction data set to at least one existing data field in an existing data set relating to the specified consumer and the specified merchant in the consumer/transaction database;
determining in real time, based at least in part upon the comparing, a consumer activity data set, wherein the consumer activity data set includes:
data of prior activity of the consumer with the specified merchant and with an unaffiliated merchant who have both agreed to sharing information about the consumer compiled by the specified merchant and the unaffiliated merchant; and
data of a merchant offering to allow the specified merchant to make a real-time decision regarding the transaction or a future transaction with the consumer; and
communicating in real-time the consumer activity data set, including the prior activity data and the merchant offering data, from the consumer processing system interface to the merchant computer of the specified merchant.

26. The method of claim 25, wherein at least one of the plurality of data fields in the consumer/transaction data set is populated with data reflecting at least one of the consumer and the transaction between the consumer and the merchant.

27. The method of claim 25, wherein at least one of the plurality of data fields in the consumer/transaction database is populated with data reflecting at least one of the historical interaction between the consumer and the merchant and a previous consumer/merchant transaction.

28. The method of claim 25, further comprising establishing the consumer activity data set based upon at least one of the following: at least one data field in the consumer/transaction data set, at least one data field in the consumer/transaction database, at least one data field in a consumer recognition database, or any combination thereof.

29. The method of claim 25, further comprising tracking the consumer's transactions with the merchant, thereby compiling tracking data specific to a consumer.

30. The method of claim 25, wherein the merchant is at least one of the following: a seller, an Internet site, an online entity, a web store, a telephone seller, a group of merchants, an organization of merchants, an entity, a corporation, a company, an offeror of goods, an offeror of services, an affiliation of a plurality of entities, or any combination thereof.

31. The method of claim 25, further comprising:
receiving at the consumer processing system computer, from the merchant computer, a plurality of consumer/transaction data sets, each data set specific to an identified consumer; and
storing the plurality of consumer/transaction data sets in the consumer/transaction database.

32. The method of claim 25, further comprising providing the merchant with a report including compiled merchant-specific data.

33. The method of claim 25, wherein the consumer activity data set includes at least one of the following: consumer/transaction data, consumer recognition data, consumer/merchant historical data, transaction data, consumer demographic data, suggested consumer interaction data, suggested consumer offer data, pre-established consumer interaction data, pre-established consumer offer data, offer data, redemption data, merchant denial data, denial instruction data, or any combination thereof.

34. The method of claim 25, wherein the consumer activity data set includes at least one of the following: (i) merchant offering data reflecting an established offer to the consumer of at least one of the following: a service, an item, a discount, a redemption, a coupon, a voucher, a non-cash benefit, an incentive, a ticket, an invitation, an event, or any combination thereof; and (ii) merchant denial data reflecting an instruction to the merchant, advising the merchant to at least one of the following: deny the transaction, deny a purchase request, deny a credit request, take a specified action with respect to the consumer, or any combination thereof.

35. The method of claim 25, further comprising assigning a consumer identification key to at least one of a unique individual consumer and a specified grouping of a plurality of consumers.

* * * * *